Patented July 7, 1942

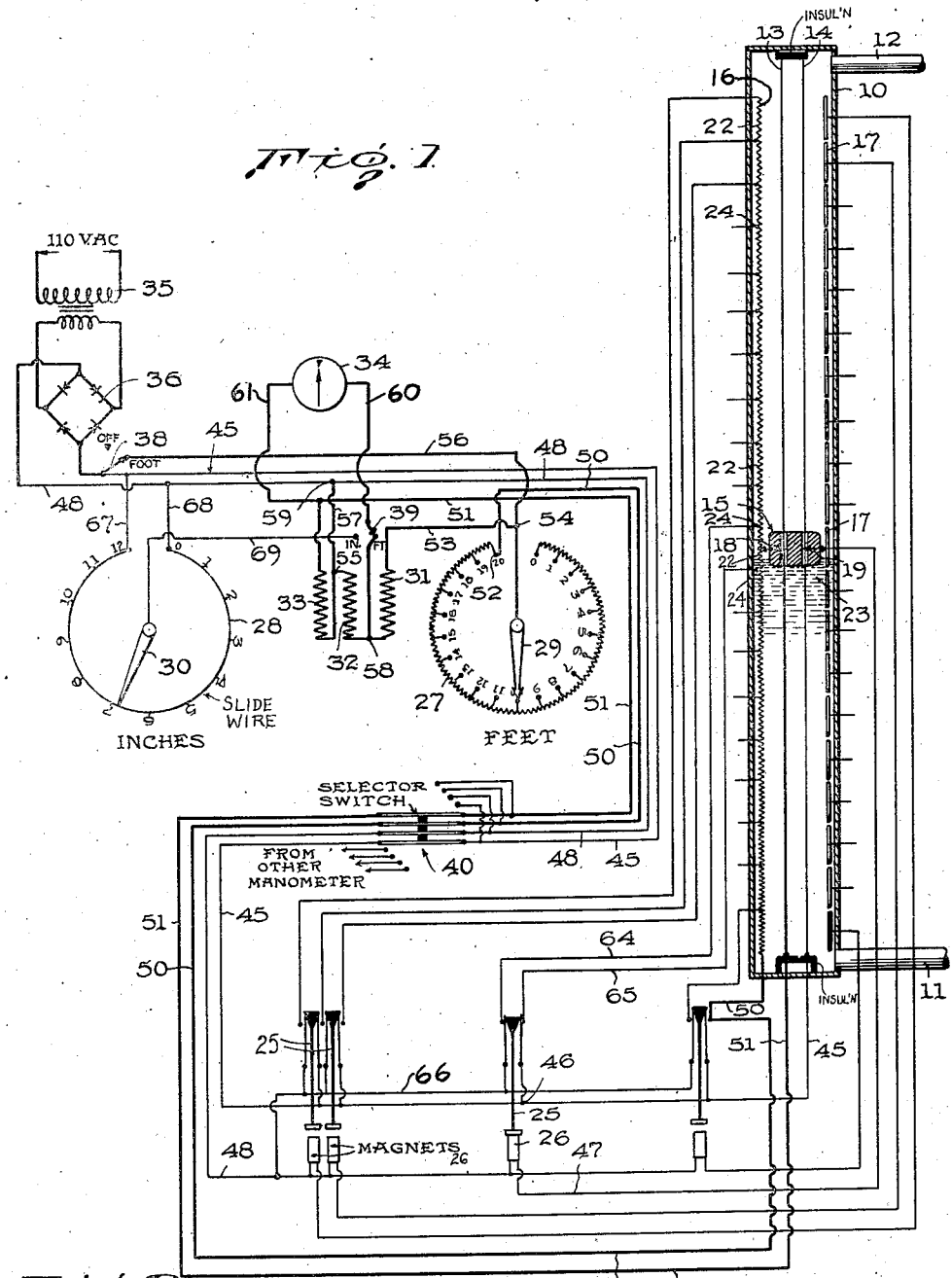

2,289,202

UNITED STATES PATENT OFFICE 2,289,202

LIQUID LEVEL GAUGE

William K. McCoy, Pittsburgh, Pa., assignor to Gulf Oil Corporation, Pittsburgh, Pa., a corporation of Pennsylvania Application October 14, 1940, Serial No. 361,142

6 Claims. (Cl. 73—313)

This invention relates to liquid gauges; and it comprises in a liquid level gauge for measuring the height of liquid in a container, a leg adapted to contain a relatively non-conductive liquid filling it to various heights and adapted to be put in pressure communication with liquid in the container, whereby the head of liquid in the container is balanced by the head of liquid in the leg, a resistor extending up the leg and tapped at intervals to define short sections of resistance, a float in the leg having a contactor making contact with the resistor, means for measuring the resistance of the portion of the resistor between the float contactor and one end of the resistor, and means for measuring the resistance of the portion of the section of the resistor between the float contactor and one of the two adjacent resistor taps; all as more fully hereinafter set forth and as claimed.

Measurement of the height of liquid in oil and gasoline tanks is an exacting problem. Measurement must be made accurately, since in large tanks a small fraction of an inch in height may correspond to a barrel of oil. The standard method involves use of a steel tape and float, but this is time-consuming and requires a correction of the reading for the varying degrees of submergence of the float in liquids of different specifice gravities; gravities which moreover change with temperature. Telemetric systems have been proposed, involving provision of a resistor in a liquid-containing leg arranged to be contacted by a float, but in my knowledge none of these have been found capable of the required accuracy. In a cylindrical tank 20 feet high and 50 feet in diameter, an error of only 0.1 per cent in resistance measurement at the upper part of the range would correspond to about six barrels of oil; which is intolerable.

According to the present invention a telemetric level-indicating device is provided which is capable of the required accuracy; in fact of higher accuracy than the standard steel tape and float system. The apparatus includes a balancing leg, containing a liquid (conveniently water) in pressure communication with the liquid (usually oil) in the tank, whereby the liquid head in the tank is balanced by the head in the leg. A resistor is provided extending up the leg, and a float making contact with the resistor. Coarse measurement means are provided for determining the resistance between the lower end of the resistor and the float. In addition, the resistor is tapped at equal intervals to define short sections of equal resistance and means are provided for determining the resistance of that portion of each section which is included between the next lower tap and the float contactor. Conveniently the resistor is tapped at intervals of one foot, one meter, one decimeter or other coarse unit and the coarse measuring means are marked in such unit. The resistance measuring means for the resistance sections is marked in inches, hundredths of a foot, centimeters, millimeters or other fine division of length. The respective resistance measurements can be accomplished in various ways. An especially convenient system includes a Wheatstone bridge for the coarse measurement and a slide wire bridge for the fine measurement. Magnetic switch means operable under control of the float connect the resistor section opposite the float at any level thereof to the slide wire.

The system of the invention is readily adapted for remote (telemetric) indication and for use of a single resistance measuring unit with a number of separate balancing legs applied to a number of tanks. It can be adapted for measuring heights in tanks of non-uniform cross-section and for tanks operating under pressure.

In the accompanying drawing there is shown diagrammatically an example of a good specific embodiment of apparatus within the purview of the invention. In the drawing, Fig. 1 is a schematic view of the resistor-provided balancing leg in combination with the resistance measuring means, Fig. 2 is a simplified circuit diagram showing the active circuit in the coarse measurement, and Fig. 3 is a similar diagram showing the active circuit in the fine measurement.

Referring to the drawing, the apparatus includes a vertical pipe or leg 10 with a high pressure connection 11 and a low pressure connection 12 in pressure-communicating relation respectively with the bottom and top (or other levels between which heights are to be determined) of a tank or the like, not shown. The hydrostatic head of the leg is equal to the maximum head encountered in the tank. Within the pipe is mounted a pair of wires 13 and 14, advantageously of sufficient conductivity and cross-section that their resistance can be neglected. The pipe in use contains a relatively non-conducting liquid 23 such as pure water which fills the pipe to a height depending on the depth of liquid in the tank. A float 15 of insulating material rests on the liquid and slides freely on the wires. Extending the length of the pipe is a resistor 16, which may conveniently be a long, small diameter coil of resistance wire or even a straight wire of sufficiently high resistance metal. The resistor is tapped along its length, as shown at 24, at intervals equal to the major unit of length to be measured (at one foot intervals in the embodiment shown) thus defining equal resistance sections 22. The pipe also contains a series of contact strips 17 opposite the resistor, each slightly less than one foot long so as to be out of contact with each other, and in insulated relation to each other. The float is provided with brushes or contactors 18 and 19 adapted to make connection between resistor 16 and wire 13, and wire 14 and strips 17, respectively. The several electrical elements are in insulated relation to the pipe 10.

The electrical indicating system includes a set of relay switches 25, normally open and operable by magnets or solenoids 26. One switch is provided for each segment of resistor 16, but in the drawing, for the sake of clarity, only four of the switches and their connections are shown. A modified Wheatstone bridge is provided, including a multi-point variable resistor 27 for the foot determination and a slide wire resistor 28 for the inch determination, and rotary arms 29 and 30. Three fixed resistors 31, 32 and 33, a galvanometer 34, a source of direct current in the form of an A. C. transformer 35 and rectifier 36 conveniently of the copper oxide type, and two switches 38 and 39, complete the bridge. A four-pole multi-throw selector switch 40 is provided for using the same bridge for a plurality of different manometers.

The circuits connecting the elements just described are best understood by considering the functioning of the device in making a height measurement.

The foot determination and the inch determination are made successively. In Fig. 1 the leads that are live, i. e. carry current, for the foot determination are shown in heavy lines. Switches 38 and 39 are at the position shown. This in effect puts the section of resistor 16 between float contactor 18 and the bottom in series with resistor 27 to form the unknown arm of a bridge, the other three arms of which are constituted by resistors 31, 32 and 33. The circuit is as follows: leads 50 and 51 from the lower end of resistor 16 and wire 13 respectively go to one end of resistor 27, at 52, and to one end of fixed resistor 33 as shown. Resistors 33, 32 and 31 being in series and resistor 31 being connected to arm 29 at 53, the four resistors (16 and 27 being considered as one) are in series connection. Current is applied to this resistance bridge between points 54 and 55, by leads 56 and 57 in connection with the rectifier as shown. The galvanometer is connected across the opposite diagonals of the bridge, at points 58 and 59, through leads 60 and 61.

In operation the operator simply moves contactor 29 until the bridge is as closely balanced as possible, as evidenced by a zero or minimum reading on the galvanometer. The corresponding point on resistor 27 (in the example, that marked "10") gives the foot reading. Fig. 2 shows in simplified manner the active circuit in the foot measurement.

Considering the inch measurement: assuming that the float is in the position shown, a relay circuit is completed between the D. C. source and the corresponding relay switch solenoid 26, as follows: lead 45 from one side of the rectifier is connected with wire 14 in the monometer. Current flows through these connections to float contactor 19 and the corresponding strip 17, whence connection is made to one side of the corresponding solenoid 26 through a lead 47. The other side of the solenoid is connected through a lead 48 to the rectifier, completing the circuit through the solenoid and causing the switch 25 to close. If the float moves to another level, the corresponding solenoid switch closes through exactly similar circuits, and the particular switch just described opens.

To determine fractions of a foot, i. e. inches in the embodiment shown, switch 38 is opened and switch 39 is thrown to the left. This serves to connect the foot-long segment of resistor 16 lying between points 24 opposite strip 17, to the inch slide-wire 28 and the galvanometer. The circuit is as follows: Points 24 are connected by leads 64 and 65 to the corresponding solenoid switch 25, which is in closed position. These solenoid switches are all connected in parallel to lead 45 (which is live as described in connection with the relay circuit) and lead 66 which is also live. Thus the foot-long section 22 of resistor 16 between points 24 nearest the float is energized. Float contactor 18 is connected to one side of the galvanometer through lead 51 as already described and the other side of the galvanometer is connected through switch 39 and a lead 69 to the arm 30 of the inch slide-wire 28, the ends of which are connected in parallel with leads 45 and 48 through leads 67 and 68. Arm 30 is simply turned until the galvanometer comes to zero, and then the inches are read off the slide wire. In the example shown the height of the balancing liquid measured is 10 feet 6¾ inches. By dividing this value by the specific gravity of the tank liquid the height of the liquid in the tank is found. Simple modification of the bridge circuit enables the height to be read directly if desired.

Fig. 3 shows the active circuit during the inch measurement, in simplified manner.

For the liquid in the balancing leg pure water, of low conductivity, is especially suitable. With water in the leg, errors due to varying degrees of submergence of the float with liquids of varying specific gravities are eliminated while thermal expansion effects are obviated. This is especially advantageous where tanks of different kinds of liquid are arranged for telemetric height measurement at a single central station. To obtain accurate volume measurement it is only necessary to know the specific gravity of the tank liquid at its base temperature. Necessity for base temperature correction calculations in stock control is dispensed with. Also, with water there is no deposition of gum or other foreign materials on the resistor and contact elements. It is advantageous to arrange the float contactors under the surface of the water, or within a thin layer of pure oil floated on top of the water, to avoid any fire hazard. However, the required currents and voltages are low enough to make the danger of sparking negligible. If desired the leg 10 can contain liquid from the tank.

No special calibration of the several resistors is required. The contact resistance of the relay switches does not enter into the measurements.

The bridge assembly, galvanometer and energy supply can be mounted as a unit at some central point or otherwise where desired. If desired such unit can be made portable for application to balancing legs in distant places. Other bridge arrangements than that disclosed can be employed for measuring the resistances.

What I claim is:

1. In a liquid level gage having a leg filled to varying heights with a liquid the height of which is to be measured, an elongated resistor in the leg, float means in the leg responsive to the level of liquid in the leg and provided with an electrical contactor adapted to make electrical contact with the resistor at a point thereon depending upon the level of the liquid and means for measuring the resistance of a section of the resistor between one end thereof and said point of contact: the improvement comprising a plurality of spaced taps along the length of said resistor and means for measuring the resistance of the section of the resistor between said point of contact and one of the adjacent taps.

2. A liquid level gage for measuring the height of liquid in tanks holding a non-aqueous liquid such as oil or gasoline, comprising a tube containing a column of water in pressure-balancing relation to liquid in a tank, whereby the height of the water in the tube depends on the height of liquid in the tank, an elongated resistor extending along the interior of the tube, a float on the column of water provided with a contactor adapted to make electrical contact with the resistor, means for measuring the resistance of the portion of the resistor from one end of the resistor to the point of contact, a plurality of spaced taps along the resistor and means for measuring the resistance of the section of resistor included between said point of contact and one of the adjacent taps.

3. In liquid level measuring apparatus of the type described, a leg adapted to contain a relatively non-conductive liquid filling it to a variable height, a resistor extending up inside the leg and tapped at closely spaced intervals to define plural sections of equal resistance, a float in the leg having a contactor adapted to make contact with the resistor, resistance bridge means for measuring the resistance of the portion of the resistor from one end thereof to the float contactor and resistance bridge means for measuring the section of resistance between the float contactor and one of the adjacent taps.

4. In liquid level measuring apparatus of the class described, a leg adapted to contain a relatively non-conductive liquid filling it to various heights, a resistor extending up the leg and tapped at equal intervals to define sections of equal resistance, a float in the leg having a contactor adapted to make contact with the resistor, a pair of resistance-measuring means, circuit means for connecting one of the resistance-measuring means to the float contactor and to one end of the resistor, for measurement of the resistance of the portion of resistor between said contactor and end, and circuit means for connecting the other resistance-measuring means to the taps on the resistor on each side of the float contactor, for measurement of the resistance of the portion of the resistor between the float contactor and one of said adjacent taps.

5. In liquid level measuring apparatus of the class described, a leg adapted to contain a relatively non-conductive liquid filling it to various heights, a resistor extending up the leg and tapped at equal intervals to define sections of equal resistance, a series of separate contact elements in the leg opposite said sections of the resistor, a float in the leg having a contactor adapted to make contact with the resistor and a contactor adapted to make contact with the contact elements, a resistance measuring means, circuit means connecting said measuring means with one end of said resistor and with the float resistor contactor, for measurement of the resistance of the portion of the resistor between said contactor and end, a series of normally open switches each having electrically operable closing means, circuit means including a source of electrical energy connecting each electrically operable means with a corresponding leg contact element, whereby on contact of the float contact contactor with any one of the leg contacts the corresponding switch is closed, leads connecting each of said equal sections of the resistor to one of said switches, a second resistance measuring means, and circuit means connecting each switch to said second resistance measuring means; whereby to measure the resistance of the portion of the section of the resistor between the float contactor and one of the adjacent taps.

6. In liquid level measuring apparatus of the type described, a leg containing a column of relatively non-conductive liquid, the level of which is to be measured, filling the leg to a variable height, a resistor extending up within the leg and tapped at a plurality of closely spaced intervals to define a plurality of resistance sections, a like plurality of closely spaced vertically extended conductive elements spaced along the inside of the leg and electrically insulated from each other, a float on the liquid column, provided with one resistor-contactor adapted to make contact with the resistor, and a separate contactor adapted to make contact with one of the conductive elements, separate electrical leads to the resistor-contactor and to the conductive-element contactor of such character as to maintain electrical connection therewith without interfering with rise and fall of the float, an electrical resistance measuring circuit connected to said resistor-contactor lead and to one end of the resistor, for measuring the resistance of the portion of the resistor from one end thereof to the point of contact with the resistor-contactor, a second resistance measuring circuit, and means for connecting the second measuring circuit, through said second lead, to that conductive element which is contacted by the float conductive-element contactor, and to a tap on the resistor adjacent the point of contact of the resistor contactor, whereby to measure the resistance between said tap and said point.

WILLIAM K. McCOY.